(12) United States Patent
Tsuchida et al.

(10) Patent No.: US 9,094,607 B2
(45) Date of Patent: Jul. 28, 2015

(54) IMAGE CAPTURE DEVICE, IMAGE PROCESSOR AND IMAGE PROCESSING METHOD

(71) Applicant: Panasonic Corporation, Osaka (JP)

(72) Inventors: Yukitaka Tsuchida, Osaka (JP); Motonori Ogura, Osaka (JP); Yuji Ueda, Osaka (JP); Masahiro Murakami, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 46 days.

(21) Appl. No.: 13/969,728

(22) Filed: Aug. 19, 2013

(65) Prior Publication Data
US 2014/0063272 A1    Mar. 6, 2014

(30) Foreign Application Priority Data

Sep. 4, 2012 (JP) .................................. 2012-193780
Mar. 14, 2013 (JP) .................................. 2013-052266

(51) Int. Cl.
*H04N 5/228* (2006.01)
*H04N 5/232* (2006.01)

(52) U.S. Cl.
CPC ....... *H04N 5/23267* (2013.01); *H04N 5/23258* (2013.01)

(58) Field of Classification Search
CPC   H04N 5/232; H04N 5/23267; H04N 5/23258
USPC ................. 348/208.99, 208.1–208.8, 208.11; 359/554–557; 396/52–55
See application file for complete search history.

(56) References Cited

U.S. PATENT DOCUMENTS

2012/0092511  A1*  4/2012  Wakamatsu ............... 348/208.2

FOREIGN PATENT DOCUMENTS

| JP | 2002-094877 A | 3/2002 |
|---|---|---|
| JP | 2009-139827 A | 6/2009 |
| JP | 2010-093607 A | 4/2010 |
| JP | 2011-234121 A | 11/2011 |
| JP | 2011-257714 A | 12/2011 |
| JP | 2012-022474 A | 2/2012 |

OTHER PUBLICATIONS

Co-pending U.S. Appl. No. 13/969,933, filed Aug. 19, 2013.
Co-pending U.S. Appl. No. 13/969,745, filed Aug. 19, 2013.
Co-pending U.S. Appl. No. 13/969,971, filed Aug. 19, 2013.

* cited by examiner

*Primary Examiner* — Yogesh Aggarwal
(74) *Attorney, Agent, or Firm* — Renner, Otto, Boisselle & Sklar, LLP

(57) ABSTRACT

An image capture device includes: an image capturing section which captures a subject image and generates an image; an acceleration sensor which detects acceleration; an angular velocity sensor which detects angular velocity; a controller which determines, according to a result of detection obtained by the angular velocity sensor, a first correction angle that is based on a result of detection obtained by the acceleration sensor and a second correction angle that is based on a result of detection obtained by the angular velocity sensor; and an image processing section which rotates the generated image based on an angle obtained by adding together the first and second correction angles.

7 Claims, 8 Drawing Sheets

IMAGE CAPTURE DEVICE, IMAGE PROCESSOR AND IMAGE PROCESSING METHOD

BACKGROUND

1. Technical Field

The present disclosure relates to an image capture device.

2. Description of the Related Art

Japanese Laid-Open Patent Publication No. 2002-94877 discloses an electronic camera. This electronic camera writes image data representing a cropped portion of a captured image to a storage medium. And this electronic camera rotates the coordinates of that cropped portion of the captured image in such a direction in which the shake of an image on the screen in a tilt direction can be canceled.

The present disclosure provides an image capture device that can make a tilt correction more appropriately.

SUMMARY

An image capture device according to an embodiment of the present disclosure includes: an image capturing section configured to capture a subject image and to generate an image; an acceleration sensor configured to detect acceleration; an angular velocity sensor configured to detect angular velocity; a controller configured to determine, according to a result of detection obtained by the angular velocity sensor, a first correction angle that is based on a result of detection obtained by the acceleration sensor and a second correction angle that is based on a result of detection obtained by the angular velocity sensor; and an image processing section configured to rotate the generated image based on an angle obtained by adding together the first and second correction angles.

According to the technique of the present disclosure, an image capture device that can make a tilt correction more appropriately is provided.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

(Embodiment 1)

1-1. Outline

The digital camcorder 100 of this embodiment has a tilt correction function and a rotational shake correction function. In this description, the "tilt correction function" is a function for correcting the tilt of a captured image which is caused by the device's own tilt with respect to the direction of the acceleration of gravity. The digital camcorder 100 corrects electronically the tilt of an image by calculating, based on the output of an acceleration sensor 260, how much its own device tilts with respect to the direction of the acceleration of gravity and by rotating the captured image in a direction in which the tilt of the captured image can be canceled. On the other hand, the rotational shake correction function refers herein to the function of reducing the influence of the device's own shake (i.e., so-called "camera shake") in the roll direction on the captured image.

The digital camcorder 100 corrects electronically the captured image by rotating, based on the output of an angular velocity sensor 250, the coordinates of a cropped portion of the captured image in such a direction in which the tilt in the roll direction and/or the rotational shake can be canceled.

Hereinafter, the configuration and operation of the digital camcorder 100 of this embodiment will be described with reference to the accompanying drawings.

1-2. Configuration

First of all, the configuration of the digital camcorder 100 of this embodiment will be described with reference to FIG. 1.

Figure 1:
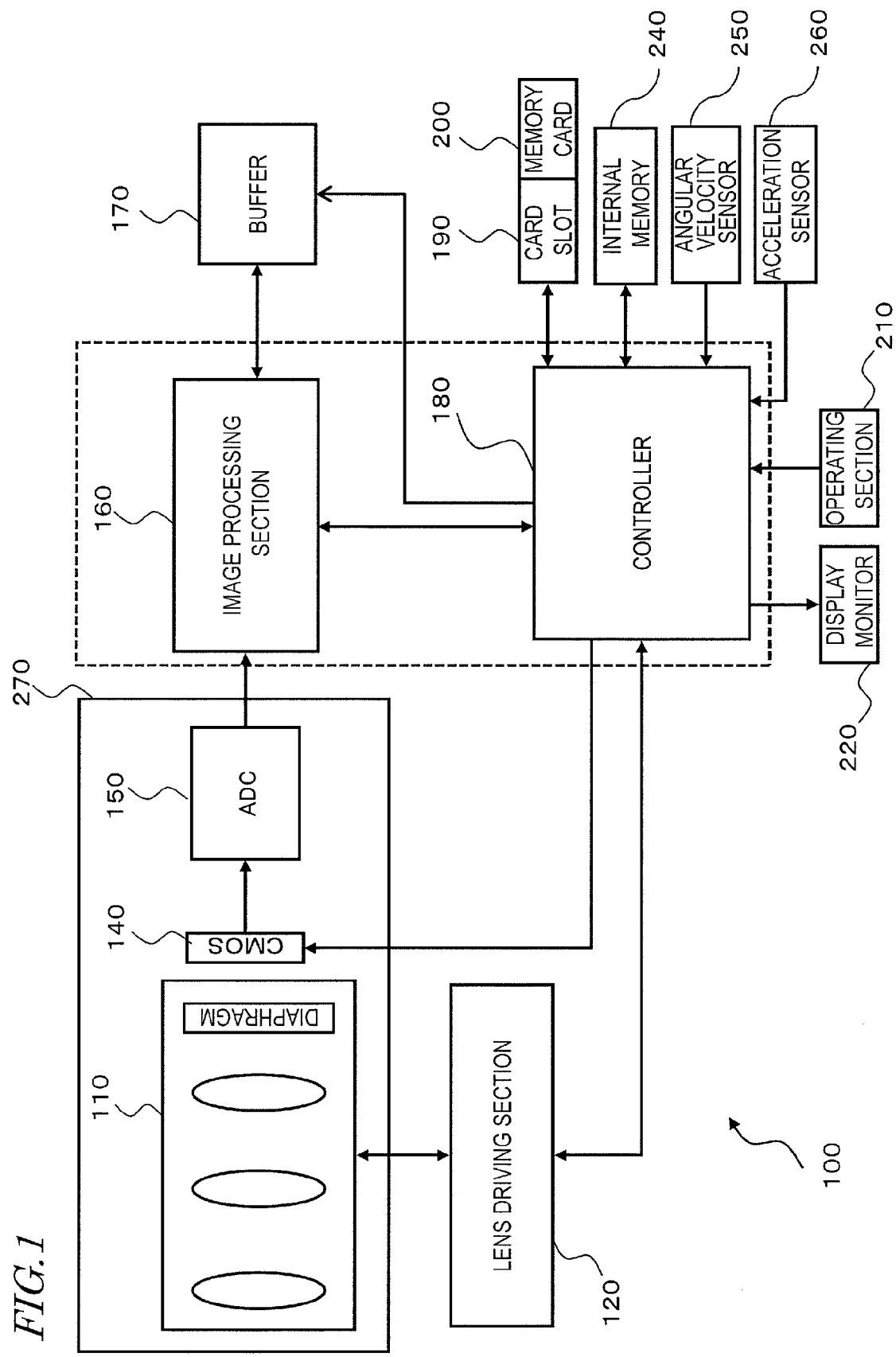
FIG. 1 is a block diagram illustrating a configuration for a digital camcorder 100 according to a first exemplary embodiment.

FIG. 1 is a block diagram illustrating a configuration for the digital camcorder 100. This digital camcorder 100 includes an optical system 110, a lens driving section 120, a CMOS image sensor 140, an A/D converter 150, an image processing section 160, a buffer 170, a controller 180, a card slot 190, a memory card 200, an operating section 210, a display monitor 220, an internal memory 240, an angular velocity sensor 250, and an acceleration sensor 260. In this digital camcorder 100, a subject image that has been produced through the optical system 110 including a single or multiple lenses or multiple groups of lenses is sensed by the CMOS image sensor 140. The image processing section 160 subjects the image data that has been generated by the CMOS image sensor 140 to various kinds of processing and then writes processed image data to the memory card 200.

Hereinafter, these components of this digital camcorder 100 will be described in further detail.

The optical system 110 has a diaphragm, an optical image stabilizer (OIS) lens and multiple groups of lenses including a zoom lens, and a focus lens. By moving the zoom lens along the optical axis, the subject image can be either zoomed in on or zoomed out. Also, by moving the focus lens along the optical axis, the focus of the subject image can be adjusted. In FIG. 1, three lenses are illustrated. However, this is only an example and any other appropriate number of lenses may be used to form the optical system 110 according to the functions required.

The OIS lens is movable within a plane that crosses the optical axis of the optical system 110 at right angles. By shifting the OIS lens in such a direction as to cancel the shake of the digital camcorder 100, the influence of the shake of the digital camcorder 100 on the captured image can be reduced.

The diaphragm adjusts the size of the aperture either in accordance with the user's setting or automatically, thereby controlling the quantity of light transmitted.

Optionally, the optical system 110 may further include a zoom actuator which drives the zoom lens, an OIS actuator which drives the OIS lens, a focus actuator which drives the focus lens, and a diaphragm actuator which drives the diaphragm.

The lens driving section 120 drives these various kinds of lenses and diaphragm included in the optical system 110 by controlling the zoom actuator, focus actuator, OIS actuator and diaphragm actuator included in the optical system 110.

The CMOS image sensor 140 detects the subject image that has been produced by the optical system 110, thereby generating analog image data. The CMOS image sensor 140 performs various kinds of operations including exposure, transfer and electronic shuttering.

The A/D converter 150 converts the analog image data that has been generated by the CMOS image sensor 140 into digital image data.

In this embodiment, the image capturing section 270 is made up of a plurality of components including the optical system 110, the CMOS image sensor 140 and the A/D converter 150. The image capturing section 270 sequentially generates digital image data, including a plurality of frames that are continuous with each other, and outputs the digital image data one after another.

The image processing section 160 performs various kinds of processing on the image data that has been generated by the CMOS image sensor 140, thereby generating image data to be displayed on the display monitor 220 or image data to be written on the memory card 200. For example, the image processing section 160 performs gamma correction, white balance correction, defect correction and various other kinds of processing on the image data that has been generated by the image capturing section 270. Also, the image processing section 160 compresses the image data that has been generated by the image capturing section 270 compliant with predetermined standard such as the H.264 standard or the MPEG-2 standard. The image processing section 160 may be implemented as a digital signal processor (DSP) or a microcomputer (microprocessor), for example.

The image processing section 160 subjects the image data to rotation processing, thereby reducing the influence to be caused in the roll direction to the image produced on the CMOS image sensor 140 by the device's own tilt or rotational shake. Suppose a situation where the shooter has shot the subject image with the digital camcorder 100 tilted θ degrees counterclockwise. In that case, the subject image will be captured so as to be tilted θ degrees counterclockwise. At this time, the image processing section 160 rotates the coordinates of a portion of the image data to be cropped θ degrees clockwise and then crops image data. This cropping processing will be described in detail later. In this manner, the image processing section 160 generates image data that is less affected by the device's own tilt or shake.

The controller 180 controls the overall operation of this digital camcorder 100. The controller 180 may be implemented as a semiconductor device, for example. The controller 180 may be implemented as only a set of dedicated hardware components or as combination of hardware components and software. The controller 180 may be implemented as a microcomputer, for example.

The buffer 170 functions as a work memory for the image processing section 160 and the controller 180 and may be implemented as a DRAM or a ferroelectric memory, for example.

The card slot 190 is an interface, to/from which the memory card 200 is readily insertable and removable, and can be connected to the memory card 200 both mechanically and electrically. The memory card 200 includes a flash memory, a ferroelectric memory or any other kind of internal memory, and can store image files and other data that have been generated by the image processing section 160.

The internal memory 240 may be implemented as a flash memory or a ferroelectric memory, for example, and may store a control program for controlling the overall operation of this digital camcorder 100.

The operating section 210 is a generic term which collectively refers to various kinds of user interfaces through which the user can enter his or her instructions. The operating section 210 includes cross keys, an ENTER button and tilt correction setting buttons which accept the user's instructions.

The display monitor 220 may display either an image represented by the image data that has been generated by the CMOS image sensor 140 (i.e., a through-the-lens image) or an image represented by the image data that has been read out from the memory card 200. In addition, the display monitor 220 can also display various kinds of menus which allow the user to change various settings of this digital camcorder 100.

Figure 2A:
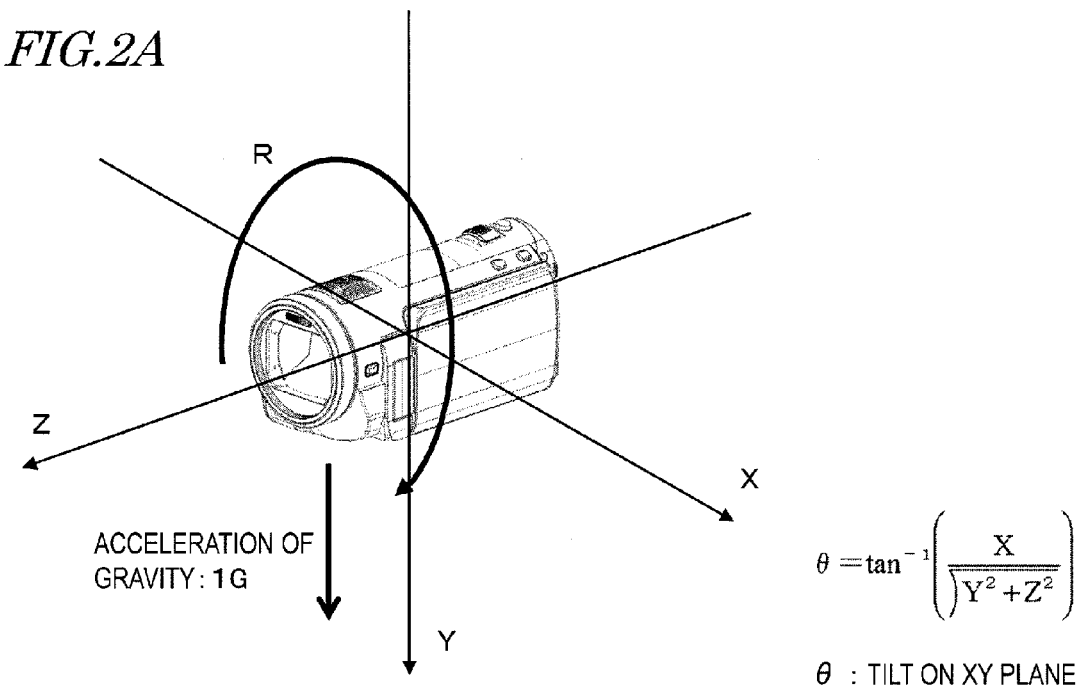
FIGS. 2A to 2C schematically illustrate the axes of detection of an acceleration sensor and an angular velocity sensor.

Next, the respective axes of detection of the acceleration sensor 260 and the angular velocity sensor 250 provided for the digital camcorder 100 of this embodiment will be described with reference to FIGS. 2A to 2C, each of which schematically illustrates the axes of detection of the acceleration sensor 260 and the angular velocity sensor 250.

The acceleration sensor 260 detects the tilt of this digital camcorder 100 with respect to the direction of the acceleration of gravity. As shown in FIG. 2A, the acceleration sensor 260 of this embodiment includes a sensor which detects an acceleration component in the optical axis direction (i.e., the Z-axis direction) of this digital camcorder 100, a sensor which detects an acceleration component within a plane that crosses the Z-axis at right angles and in the horizontal direction (i.e., X-axis direction) of this digital camcorder 100, and a sensor which detects an acceleration component within a plane that crosses the Z-axis at right angles and in the perpendicular direction (i.e., Y-axis direction) of this digital camcorder 100. In this description, these sensors will be collectively referred to herein as an "acceleration sensor 260". It should be noted that if the optical axis of this digital camcorder 100 is supposed to be the Z-axis, the X- and Y-axes are fixed on this digital camcorder 100. And even if this digital camcorder 100 gets tilted with respect to the direction of the acceleration of gravity, the X-, Y- and Z-axis directions are fixed on this digital camcorder 100.

The acceleration sensor 260 outputs signals representing acceleration components which have been detected by itself in the X-, Y- and Z-axis directions to the controller 180. By analyzing the respective output signals in the X-, Y- and Z-axis directions of the acceleration sensor 260, the controller 180 determines a first quantity of correction (i.e., a first correction angle) to correct the tilt of this digital camcorder 100 with respect to the direction of the acceleration of gravity. In this case, if the respective values of the acceleration components that have been detected in the X-, Y- and Z-axis directions are indicated by X, Y and Z, respectively, the tilt angle $\theta_0$ defined by this digital camcorder 100 with respect to the direction of the acceleration of gravity can be calculated by the following Equation (1):

$$\theta = \tan^{-1}\left(\frac{X}{\sqrt{Y^2 + Z^2}}\right) \quad (1)$$

If the digital camcorder 100 is not tilted in the pitch direction (P direction), the value Z of the acceleration component in the Z-axis direction becomes equal to zero. As a result, the tilt angle $\theta_0$ that takes only the rotation in the roll direction (R direction) into account is calculated by the following Equation (2) using the values of the acceleration components in the X- and Y-axis directions:

$$\theta = \tan^{-1}\left(\frac{X}{Y}\right) \quad (2)$$

Figure 2B:
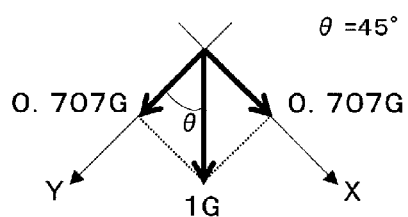
Figure 2C:
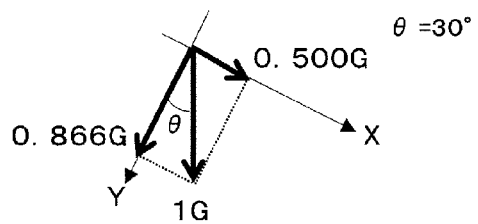

For example, suppose the digital camcorder 100 defines a tilt angle of 45 degrees with respect to the direction of the acceleration of gravity as shown in FIG. 2B. In that case, if the magnitude of the acceleration of gravity is 1 G, the acceleration sensor 260 detects 0.707 G as the X and Y values. On the other hand, if the camcorder itself defines a tilt angle of 30 degrees with respect to the direction of the acceleration of gravity as shown in FIG. 2C, then the acceleration sensor 260 detects 0.500 G and 0.866 G as the X and Y values, respectively.

The angular velocity sensor 250 detects the angular velocity of this digital camcorder 100. As shown in FIG. 2A, the angular velocity sensor 250 of this embodiment includes a sensor which detects the angular velocity of the movement of this digital camcorder 100 to be caused in the roll (R) direction due to a camera shake, for example. The angular velocity sensor 250 may further include a sensor for detecting the angular velocity in the yaw direction and a sensor for detecting the angular velocity in the pitch direction, in addition to the sensor for detecting the angular velocity in the roll direction. By analyzing the output signal of the angular velocity sensor 250 as for the roll direction, the controller 180 calculates a second quantity of correction (i.e., a second correction angle) to make a correction on the shake in the roll direction.

1-3. Tilt Correction Operation

This digital camcorder 100 has the function of making a tilt offset correction in the roll direction. In addition, the digital camcorder 100 also has the function of correcting the tilt and rotational shake of a captured image in the roll direction.

Hereinafter, it will be described exactly how this digital camcorder 100 makes a tilt offset correction in the roll direction and corrects the tilt and rotational shake of a captured image in the roll direction.

1-3-1. Tilt Offset Correction Operation

Figure 3:
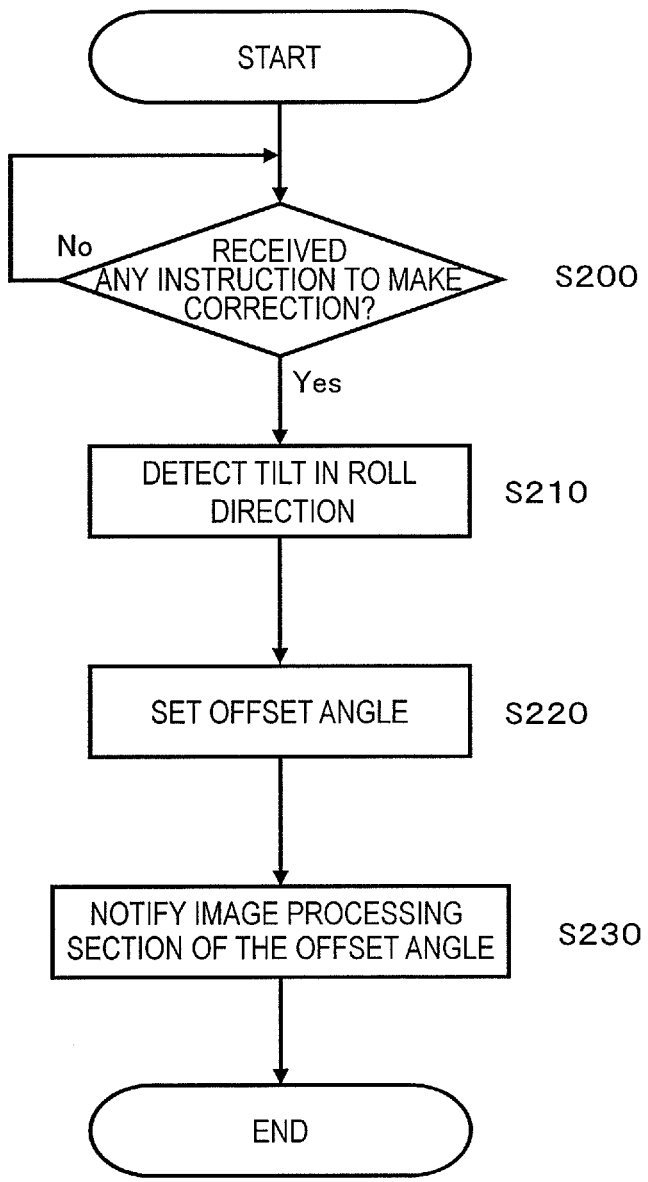
FIG. 3 is a flowchart showing the procedure of a tilt offset correction operation.
Figure 4A:
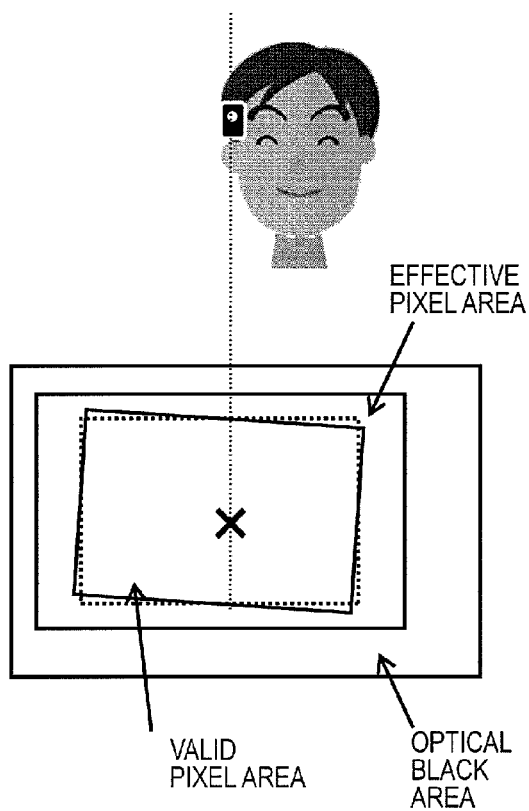
FIGS. 4A and 4B schematically illustrate how to perform the tilt offset correction operation.
Figure 4B:
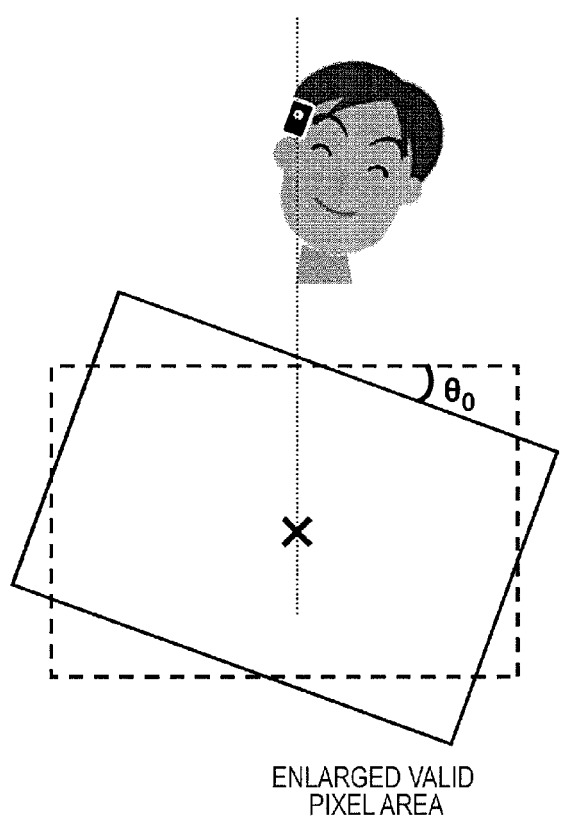

First of all, the tilt offset correction operation (function) will be described in detail with reference to FIGS. 3, 4A and 4B. FIG. 3 is a flowchart showing the procedure of the tilt offset correction operation. FIGS. 4A and 4B schematically illustrate how to perform the tilt offset correction operation.

This digital camcorder 100 has various applications, one of which is a wearable camera that a person uses by putting it on his or her face or clothes as shown in FIGS. 4A and 4B. If this digital camcorder 100 is used as a wearable camera, the wearer can record, as a still picture or a moving picture, what he or she is experiencing right in front of him or her (e.g., how he or she is skiing) and the viewer can enjoy such video with a lot of presence that was recorded by the wearer.

In such a situation, when the user puts on this digital camcorder 100, the digital camcorder 100 may get tilted with respect to the direction of the acceleration of gravity and the captured image may get tilted in the roll direction depending on how he or she is wearing it as shown in FIG. 4B. For example, if he or she puts the digital camcorder 100 on his or her face, the digital camcorder 100 may not be attached horizontally and may get tilted with respect to the direction of the acceleration of gravity. In that case, the shooting session will be carried out with the digital camcorder 100 left tilted in the roll direction, thus making the recorded image uncomfortable to view.

Thus, to avoid such an unwanted situation, on accepting a predetermined correction instruction, the image processing section 160 rotates the image supplied from the image capturing section 270 in such a direction as to cancel the tilt of the image by using the reference angle $\theta_0$ (offset angle) that has been calculated based on the output signal of the acceleration sensor 260 as a reference of tilt correction processing. Even if the digital camcorder 100 is not held horizontally, the tilted image captured by the digital camcorder 100 held in such a tilted position can be corrected as if the image was shot in a horizontal position by rotating the image using the reference angle $\theta_0$ as the reference of the tilt correction processing. As a result, even if the digital camcorder 100 is not held horizontally, appropriate video can still be recorded in the horizontal position and the video that has been shot in such a tilted position can still be viewed comfortably.

First of all, the user puts this digital camcorder 100 on his or her face or clothes, for example. Next, he or she turns the digital camcorder 100 ON, when the controller 180 instructs a power supply section (not shown) to supply power to respective sections that form this digital camcorder 100. In response, the CMOS image sensor 140 starts capturing an image and the image processing section 160 starts image processing. Meanwhile, the acceleration sensor 260 starts detecting acceleration components in the X-, Y- and Z-axis directions and the controller 180 analyzes the result of detection of the acceleration in the three axis directions, thereby sensing how much the digital camcorder 100 is tilted with respect to the direction of the acceleration of gravity.

The controller 180 monitors if the controller 180 has received any instruction to make a tilt correction from the user who has put the digital camcorder 100 on (in Step S200). Optionally, after the digital camcorder 100 has been turned ON, the controller 180 may issue such an instruction to make a tilt correction by itself. Alternatively, when the user presses down a movie recording button (i.e., when he or she issues an instruction to record a moving picture) or taps a tilt correction setting button included in the operating section 210, the controller 180 may issue an instruction to make a tilt correction. Still alternatively, the tilt correction instruction may even be issued by a remote device such as a smart phone. In this embodiment, by operating the operating section 210, the tilt correction instruction is given to the controller 180.

Next, if the controller 180 has accepted such a tilt correction instruction from the user through the operating section 210 (i.e., if the answer to the query of the processing step S200 is YES), then the controller 180 analyzes the output of the acceleration sensor 260 (in Step S210). And at the timing to make the tilt correction as specified by the user, the controller 180 performs the arithmetic operation given by Equation (1) based on the output value of the acceleration sensor 260. Then, the controller 180 determines the tilt angle $\theta_0$ of the digital camcorder 100 in the roll direction with respect to the direction of the acceleration of gravity (in Step S210).

In this embodiment, the controller 180 is supposed to determine the tilt angle $\theta_0$ of the digital camcorder 100 in the roll direction with respect to the direction of the acceleration of, gravity based on the respective acceleration components in the three axis directions that have been obtained by Equation (1). However, this is just an example of the present disclosure. Alternatively, if the digital camcorder 100 is not tilted in the pitch direction (P direction), the controller 180 may also determine the tilt angle $\theta_0$ based on the respective acceleration components in the two axis directions that have been obtained by Equation (2). That is to say, the controller 180 can calculate the tilt angle $\theta_0$ based on the respective acceleration components in at least two out of the three axis directions.

Next, the controller 180 sets the tilt angle $\theta_0$ to be an angle $-\theta_0$ that cancels the tilt of the video (i.e., an offset angle $-\theta_0$) in Step S220.

Subsequently, the controller 180 notifies the image processing section 160 of this offset angle $-\theta_0$ (in Step S230).

Finally, the image processing section 160 rotates the image that has been generated by the image capturing section 270 by defining the tilt angle $\theta_0$ to be the reference of the tilt correction processing.

In this description, "to rotate an image by defining the tilt angle $\theta_0$ to be the reference of tilt correction processing" means the following. As described above, the controller 180 accepts a tilt correction instruction and determines the device's own tilt angle $\theta_0$ in the roll direction with respect to the direction of the acceleration of gravity.

(1) if the device's own tilt angle with respect to the direction of the acceleration of gravity remains $\theta_0$ even after the tilt angle has been determined, then the image processing section 160 rotates, by that tilt correction angle $\theta_0$, the image that has been generated by the image capturing section 270; but (2) if the device's own tilt angle has increased by $\theta_{01}$ from the tilt angle $\theta_0$ after the tilt angle has been determined, then the controller 180 calculates that extra tilt angle $\theta_{01}$ with respect to the tilt angle $\theta_0$ based on the result of detection obtained by the acceleration sensor 260. And the image processing section 160 rotates, by that tilt correction angle $\theta_{01}$, the image that has been generated by the image capturing section 270 with the tilt angle $\theta_0$ defined to be the reference.

By performing this series of processing steps, the image processing section 160 can output a tilt-corrected image and video with a reduced tilt can be recorded with good stability.

Now take a look at FIG. 4A, which illustrates respective pixel areas of the CMOS image sensor 140. The image processing section 160 rotates the captured image by the offset angle $-\theta_0$ in the roll direction, and then performs image cropping processing in the effective pixel area of the CMOS image sensor 140. Then, the image processing section 160 outputs the cropped image (i.e., the image in the valid pixel area indicated by the solid rectangle). As a result, even if the tilt of the captured image in the roll direction is corrected, an image that does not include any pixel in the optical black area can also be recorded just as intended.

The controller 180 may generate a vertical sync signal at 60 fps, for example. And the controller 180 performs the series of processing steps S200 through S230 within a vertical sync signal interval of 60 fps. As a result, an appropriate tilt correction can be made in real time.

1-3-2. How to Prioritize Either Tilt Correction or Rotational Shake Correction According to Shooting Situation Next, it will be described with reference to the flowchart shown in FIG. 5 how to prioritize either tilt correction or rotational shake correction according to the shooting situation.

The digital camcorder 100 senses the shooting situation based on the result of detection obtained by the angular velocity sensor 250 and selectively carries out either a tilt correction or a rotational shake correction according to the shooting situation. Specifically, the controller 180 determines, according to the shooting situation, which one of these two types of correction (i.e., the tilt correction or the rotational shake correction) should be given priority over the other.

Hereinafter, it will be described exactly how the controller 160 decides priorities in its processing.

First of all, if the digital camcorder 100 is operating in the shooting mode, the controller 180 senses the shooting situation based on the result of detection obtained by the angular velocity sensor 250 (in Step S300).

Figure 6:
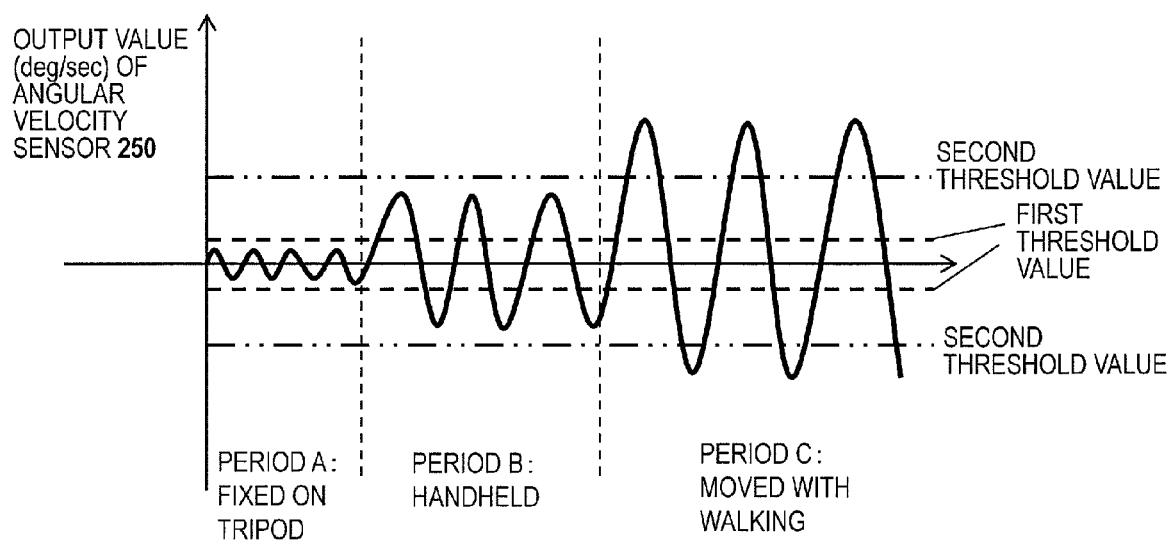
FIG. 6 schematically shows the outputs of the angular velocity sensor.

Now, it will be described with reference to FIG. 6 exactly how the controller 180 senses the shooting situation in Step S300. FIG. 6 schematically shows the outputs of the angular velocity sensor 250 in respective shooting situations. In FIG. 6, the ordinate represents the output value (deg/sec) of the angular velocity sensor 250 and the abscissa represents the time.

On the time axis shown in FIG. 6, Period A indicates a situation where the digital camcorder 100 is fixed on a tripod, for example (which will be referred to herein as "Situation A"). Period B indicates a situation where the user is shooting video with the digital camcorder 100 held and fixed in his or her hand (which will be referred to herein as "Situation B"). And Period C indicates a situation where the user is shooting video while walking and allowing the digital camcorder 100 to move significantly (which will be referred to herein as "Situation C"). The controller 180 senses the shooting situation by the amplitude or frequency of the signal supplied from the angular velocity sensor 250. Specifically, for that purpose, the controller 180 refers to the first and second threshold values shown in FIG. 6. The first and second threshold values may be stored in advance in the internal memory 240, for example. The first threshold value is used to determine whether or not the digital camcorder 100 is in Situation A. The second threshold value is used to determine whether the digital camcorder 100 is in Situation B or in Situation C. If the output value of the angular velocity sensor 250 turns out to be equal to or smaller than the first threshold value, the decision is made by the controller 180 that the digital camcorder 100 is now fixed on a tripod (in Situation A). On the other hand, if the output value of the angular velocity sensor 250 turns out to be greater than the first threshold value but less than the second threshold value, the decision is made that the digital camcorder 100 is now held and fixed in hand (in Situation B). And if the output value of the angular velocity sensor 250 turns out to be equal to or greater than the second threshold value, then the decision is made by the controller 180 that the user is shooting video with this digital camcorder 100 while walking (in Situation C).

In this example, the shooting situation is determined to be one of three stages by providing first and second threshold values. However, this is only an example of the present disclosure. Alternatively, the shooting situation may also be determined to be one of two stages with only one threshold value provided. Still alternatively, the shooting situation may also be sensed in multiple stages with three or more threshold values provided.

Next, in Step S310, the controller 180 determines the clipping amplitudes for the tilt correction and the rotational shake correction according to the shooting situation that has been sensed in the previous processing step S300.

Hereinafter, the clipping amplitudes for the tilt correction and the rotational shake correction will be described with reference to FIG. 7, which schematically illustrates the clipping amplitudes to be determined for the tilt correction and the rotational shake correction according to the shooting situation.

Figure 7:
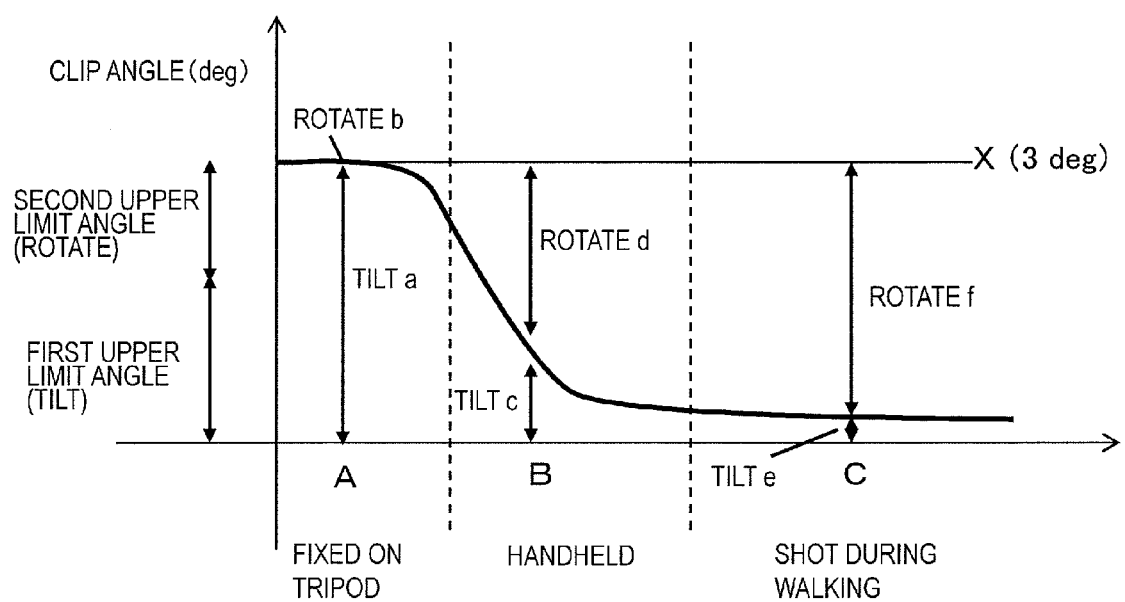
FIG. 7 schematically illustrates the clipping amplitudes to be determined for the tilt correction and the rotational shake correction depending on the shooting situation.

In this embodiment, the maximum quantity of correction (i.e., the maximum correction angle) in the roll direction around the optical axis, which is obtained by adding together the clipping amplitude for tilt correction (which will be referred to herein as a "first upper limit angle") and the clipping amplitude for rotational shake correction (which will be referred to herein as a "second upper limit angle"), is supposed to be X (3 degrees) as shown in FIG. 7. In this case, the maximum correction angle refers to the maximum permissible angle by which an image can be possibly rotated.

In this example, the maximum correction angle is supposed to be 3 degrees. However, this is just an example of the present disclosure. Rather, the maximum correction angle may be changed appropriately according to the specification of a given product. The maximum correction angle mainly depends on the size of the effective pixel area of the CMOS image sensor 140 described above. In this case, the larger the effective pixel area, the larger the maximum correction angle can be.

As shown in FIG. 7, the first and second upper limit angles are supposed to be "a" and "b", respectively, in Period A, "c" and "d", respectively, in Period B, and "e" and "f", respectively, in Period C. In any shooting situation, the sum of the first and second upper limit angles satisfies the relation X (3 deg.)=a+b=c+d=e+f.

In Period A, as the digital camcorder 100 is fixed on a tripod, tilt is produced steadily but no rotational shake is generated. That is why the controller 180 sets the first upper limit angle a to be larger than the second upper limit angle b. Meanwhile, in Period C, the user is shooting video while walking, and therefore, acceleration other than the acceleration of gravity could be produced as the digital camcorder 100 moves.

Figure 8:
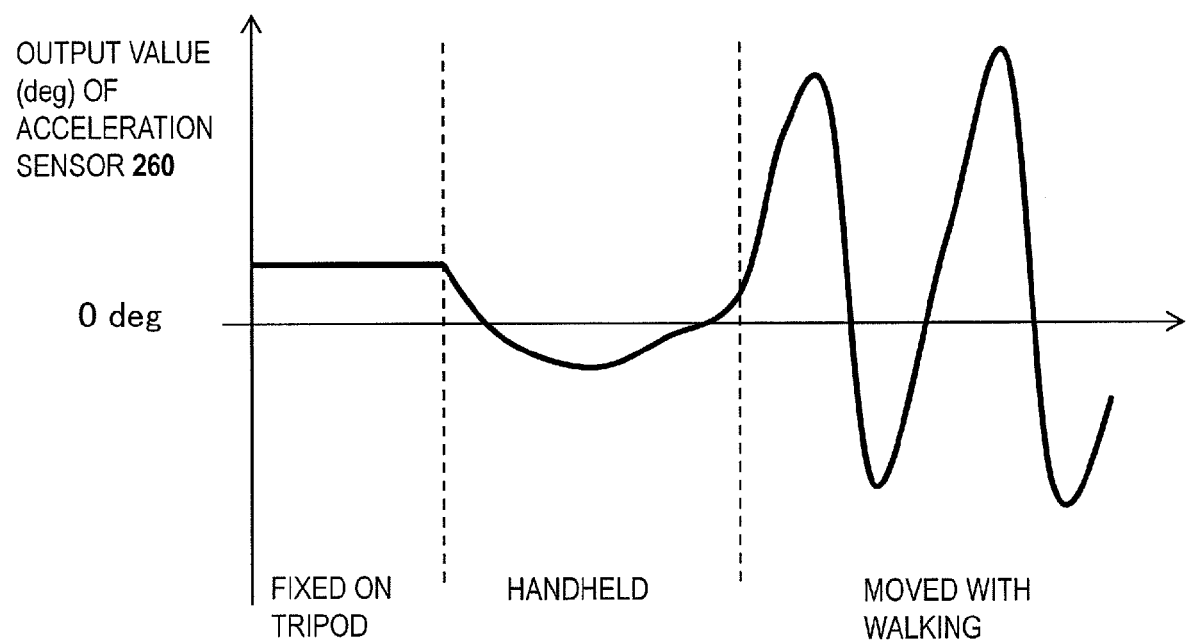
FIG. 8 schematically shows how the output value of the acceleration sensor changes.

Next, the output values of the acceleration sensor 260 in respective shooting situations will be described with reference to FIG. 8, which schematically shows how the output value of the acceleration sensor 260 changes. In FIG. 8, the ordinate represents the output value of the acceleration sensor 260 and the abscissa represents the time. As shown in FIG. 8, as the shooting situation changes, acceleration other than the acceleration of gravity (i.e., acceleration to be produced as the digital camcorder 100 moves) increases and the output signal of the acceleration sensor 260 comes to have increasing amplitude. As a result, the result of detection obtained by the acceleration sensor 260 comes to have a lower degree of reliability.

Now take a look at FIG. 7 again. In a situation where the user is shooting while walking in Period C, the tilt correction and rotational shake correction can be made effectively by setting the second upper limit angle f to be larger than the first upper limit angle e. On the other hand, in Period B, the first and second upper limit angles c and d are set to have an appropriate ratio in order to make the tilt correction and rotational shake correction effectively.

The controller 180 changes the ratio of the clipping amplitudes continuously so as to prevent the image from becoming discontinuous between frames due to a change in clipping amplitude.

In the internal memory 240, stored in advance is information about a curve representing how the ratio of the first and second upper limit angles changes according to the shooting situation such as the one shown in FIG. 7. By reference to that information about such a curve as stored in the internal memory 240, the controller 180 determines the clipping amplitudes (i.e., the first and second upper limit angles) so as to prevent the image from becoming discontinuous between frames.

Suppose the shooting situation at a certain point in time is "handheld and fixed" (Period B). At that time, the ratio of the first and second upper limit angles becomes c to d. If the shooting situation changes into "shooting while walking" at the next point in time while the ratio is set to be c to d, the controller 180 does not change the ratio of the first and second upper limit angles into e to f immediately at that point in time. Instead, by reference to the information about the curve representing how the ratio changes as stored in the memory, the controller 180 changes the ratio of the first and second upper limit angles from c to d into e to f continuously. If the shooting situation remains "shooting while walking" and if the ratio being changed continuously becomes e to f, then the controller 180 fixes the ratio at e to f until the shooting situation changes next time.

On the other hand, if the shooting situation changes while the ratio is being changed continuously from c to d into e to f, then the controller 180 varies the ratio being changed continuously according to the shooting situation.

In this manner, the controller 180 changes the ratio of the clipping amplitudes continuously so as to prevent the image from becoming discontinuous between frames by changing the clipping amplitudes.

In the example described above, the shooting situation is supposed to change in three stages in the order of "fixed on tripod", "handheld and fixed" and "shooting while walking". However, this is just an example and the shooting situation does not have to change in these three stages but may further include "shooting while running". In this manner, the modes of processing can be changed appropriately between tilt correction and rotational shake correction according to the shooting situation.

Now take a look at FIG. 5 again.

Next, the controller 180 calculates a tilt correction angle $\theta_1$ (i.e., first calculated angle) based on a result of detection obtained by the acceleration sensor 260 and also calculates a rotational shake correction angle $\theta_2$ (i.e., second calculated angle) based on the integral of the outputs of the angular velocity sensor 250 (in Step S320).

Then, the controller 180 compares the first and second upper limit angles that have been obtained in Step S310 to the tilt correction angle $\theta_1$ and rotational shake correction angle $\theta_2$, respectively, thereby determining the final correction angle $\theta_3$ with the tilt correction angle $\theta_1$ and rotational shake correction angle $\theta_2$ clipped as needed (in Step S330).

Hereinafter, a specific situation where the ratio of the first and second upper limit angles is c to d will be described.

If the tilt correction angle $\theta_1$ calculated in Step S320 is smaller than the first upper limit angle c, the final correction angle about the tilt correction (i.e., the first correction angle) is determined to be $\theta_1$. On the other hand, if the tilt correction angle $\theta_1$ is greater than the first upper limit angle c, the final correction angle about the tilt correction (i.e., the first correction angle) is clipped at, and set to be equal to, the first upper limit angle c.

In the same way, if the rotational shake correction angle $\theta_2$ calculated in Step S320 is smaller than the second upper limit angle d, the final correction angle about the rotational shake correction is determined to be $\theta_2$. On the other hand, if the rotational shake correction angle $\theta_2$ is greater than the second upper limit angle d, the final correction angle about the rotational shake correction (i.e., the second correction angle) is clipped at, and set to be equal to, the second upper limit angle d.

Then, the controller 180 calculates the final correction angle $\theta_3$ by adding together the first and second correction angles that have been determined by reference to the first and second upper limit angles, respectively.

Subsequently, in Step S340, the controller 180 notifies the image processing section 160 of the final correction angle $\theta_3$ that has been determined in Step S330.

Finally, the image processing section 160 rotates the image that has been generated by the image capturing section 270 by the final correction angle $\theta_3$.

As described above, the controller 180 senses the shooting situation by either the amplitude or frequency of a signal supplied from the angular velocity sensor 250. By performing this series of processing steps S300 through S340, while the shooting is carried out with the camcorder fixed (i.e., in Period A), the tilt correction is prioritized so as to reduce the influence of the tilt of the digital camcorder 100 on the image more effectively. On the other hand, while the shooting is carried out by the user who is walking (in Period C), the rotational shake correction is prioritized so as to reduce the influence of the rotational shake on the image more effectively.

In this manner, either the tilt correction or the rotational shake correction is prioritized according to the amplitude and frequency of an output signal of the angular velocity sensor 250 (i.e., a shooting situation) within an angular range that is defined by the maximum correction angle in the roll direction around the optical axis. As a result, video can be recorded with good stability with its tilt reduced.

The controller 180 may generate a vertical sync signal at 60 fps, for example. And the controller 180 performs the series of processing steps S300 through S340 within a vertical sync signal interval of 60 fps. As a result, either tilt correction or rotational shake correction can be carried out appropriately in real time according to the shooting situation.

In this embodiment, the tilt offset correction operation and the tilt correction and rotational shake correction operations may be performed as a series of operations. In that case, the image processing section 160 rotates the image by the final correction angle $\theta_3$ using the reference angle $\theta_0$ as a reference for tilt correction processing.

1-4. Effects

As described above, the digital camcorder 100 of this embodiment includes: an image capturing section 270 configured to capture a subject image and to generate an image; an acceleration sensor 260 configured to detect acceleration; an angular velocity sensor 250 configured to detect angular velocity; a controller 180 configured to determine, according to a result of detection obtained by the angular velocity sensor 250, a first correction angle that is based on a result of detection obtained by the acceleration sensor 260 and a second correction angle that is based on a result of detection obtained by the angular velocity sensor 250; and an image processing section 160 configured to rotate the generated image based on a correction angle θ3 that is the sum of the first and second correction angles.

As a result, either the tilt correction or the rotational shake correction is prioritized according to the amplitude and frequency of an output signal of the angular velocity sensor 250 (i.e., a shooting situation) within an angular range that is defined by the maximum correction angle in the roll direction around the optical axis, and video can be recorded with good stability with its tilt reduced.

In one embodiment, the controller 180 determines first and second upper limit angles, which define the upper limits of the first and second correction angles, respectively, according to either the amplitude or frequency of an output signal of the angular velocity sensor 250.

In another embodiment, the controller 180 determines the first correction angle by comparing a first calculated angle that has been calculated based on the result of detection obtained by the acceleration sensor 260 to the first upper limit angle and also determines the second correction angle by comparing a second calculated angle that has been calculated based on the result of detection obtained by the angular velocity sensor 250 to the second upper limit angle.

In this case, the controller 180 sets the first upper limit angle to be the first correction angle if the first calculated angle is greater than the first upper limit angle and sets the first calculated angle to be the first correction angle if the first calculated angle is equal to or smaller than the first upper limit angle.

Also, the controller 180 sets the second upper limit angle to be the second correction angle if the second calculated angle is greater than the second upper limit angle and sets the second calculated angle to be the second correction angle if the second calculated angle is equal to or smaller than the second upper limit angle.

(Embodiment 2)

Next, a second embodiment of the present disclosure will be described with reference to FIG. 9.

2-1. Configuration

Figure 9:
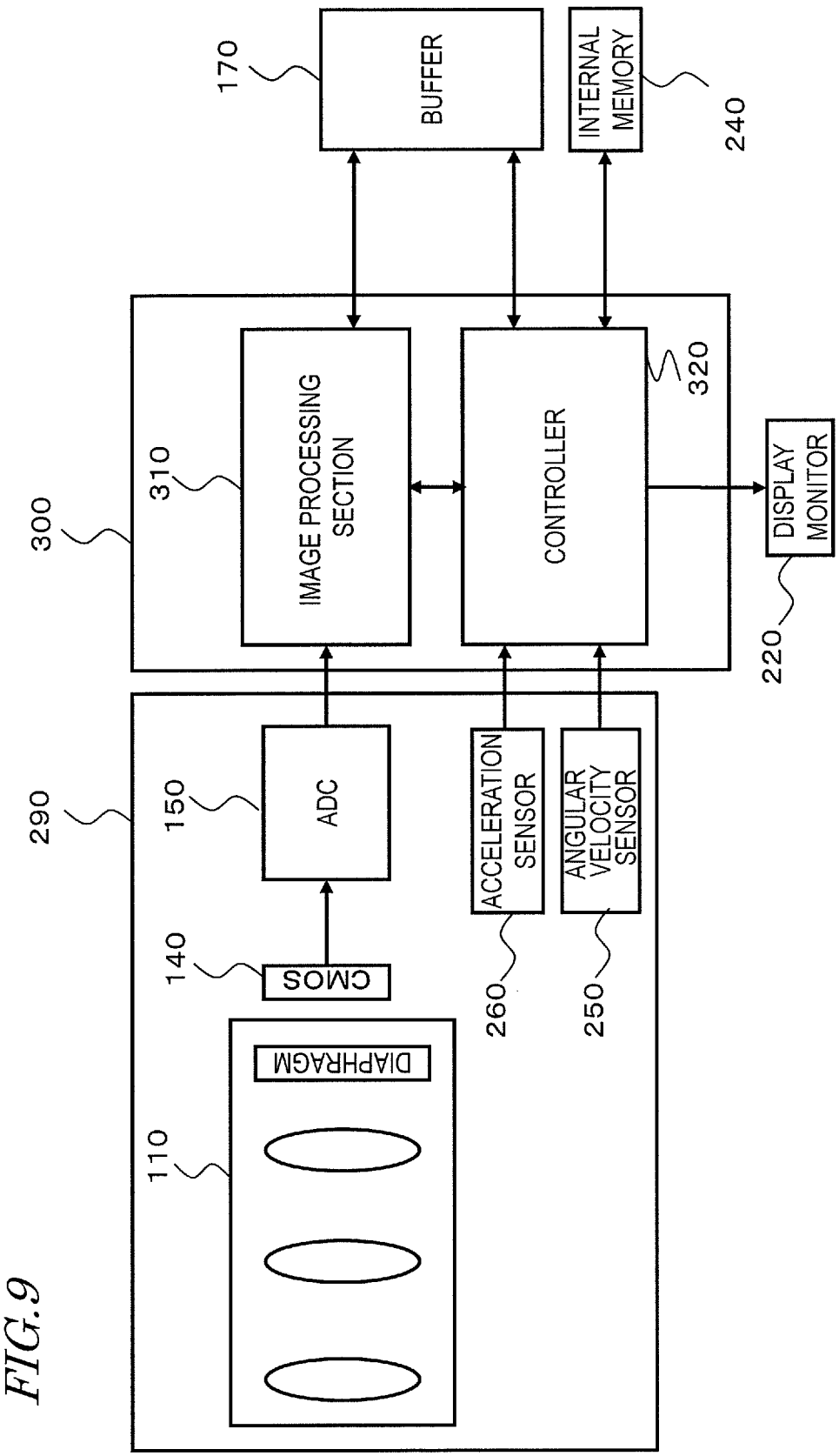
FIG. 9 illustrates a configuration for an image processor 300 as a second exemplary embodiment of the present disclosure.

FIG. 9 illustrates a configuration for an image processor 300 as a second embodiment of the present disclosure.

The image processor 300 of this embodiment includes an image processing section 310 and a controller 320. The image processor 300 includes an external interface, through which a buffer 170 may be connected to this image processor 300.

The image capturing section 290 includes an optical system 110, a CMOS image sensor 140, an A/D converter 150, an angular velocity sensor 250 and an acceleration sensor 260.

The image processor 300 subjects the image data that has been generated by the image capturing section 290 to various kinds of processing.

The A/D converter 150 of the image capturing section 290 is electrically connected to the image processing section 310 of the image processor 300. The image processing section 310 may have the same configuration as the image processing section 160 of the first embodiment described above, and a detailed description thereof will be omitted herein.

The angular velocity sensor 250 and acceleration sensor 260 of the image capturing section 290 are electrically connected to the controller 320 of the image processor 300. The controller 320 may have the same configuration as the controller 180 of the first embodiment described above, and a detailed description thereof will be omitted herein.

2-2. Operation

The image processing section 310 and controller 320 of this second embodiment operate in the same way as their counterparts 160 and 180 of the first embodiment. Thus, this image processor 300 can also perform the tilt correction operation shown in FIGS. 3 and 5. Each of those operations of this embodiment is the same as what has already been described for the first embodiment, and a detailed description thereof will be omitted herein.

2-3. Effects

As described above, an image processor 300 according to this embodiment processes an image supplied from an image capturing section 290 including an acceleration sensor 260 that detects acceleration and an angular velocity sensor 250 that detects angular velocity. The image processor 300 includes: a controller 320 configured to determine, according to a result of detection obtained by the angular velocity sensor 250, a first correction angle that is based on a result of detection obtained by the acceleration sensor 260 and a second correction angle that is based on a result of detection obtained by the angular velocity sensor 250; and an image processing section 310 configured to rotate the generated image based on a correction angle $\theta_3$ obtained by adding together the first and second correction angles.

As a result, either tilt correction or rotational shake correction is prioritized appropriately according to the shooting situation within an angular range that is defined by the maximum correction angle in the roll direction around the optical axis, and video can be shot with good stability with its tilt reduced.

(Other Embodiments)

Although Embodiments 1 and 2 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein.

Thus, some of those other embodiments will be described just as an example.

Even though the digital camcorder 100 of the first embodiment described above includes an angular velocity sensor 250, a digital camcorder 100 as a modified example of the first embodiment includes no angular velocity sensor 250 but other than that, has the same configuration as the digital camcorder 100 of the first embodiment. The digital camcorder 100 as a modified example of the first embodiment includes no angular velocity sensor 250, and therefore, does not prioritize either tilt correction or rotational shake correction according to the shooting situation unlike the first embodiment, but does include an acceleration sensor 260 and can perform a tilt offset correction operation.

Although the digital camcorder 100 as a modified example of the first embodiment is supposed to include no angular velocity sensor 250, the digital camcorder 100 may also include both an angular velocity sensor 250 and an acceleration sensor 260 as well. In that case, the digital camcorder 100 does include both of these sensors, but may still be configured to perform the tilt offset correction operation even without prioritizing either tilt correction or rotational shake correction according to the shooting situation.

Figure 5:
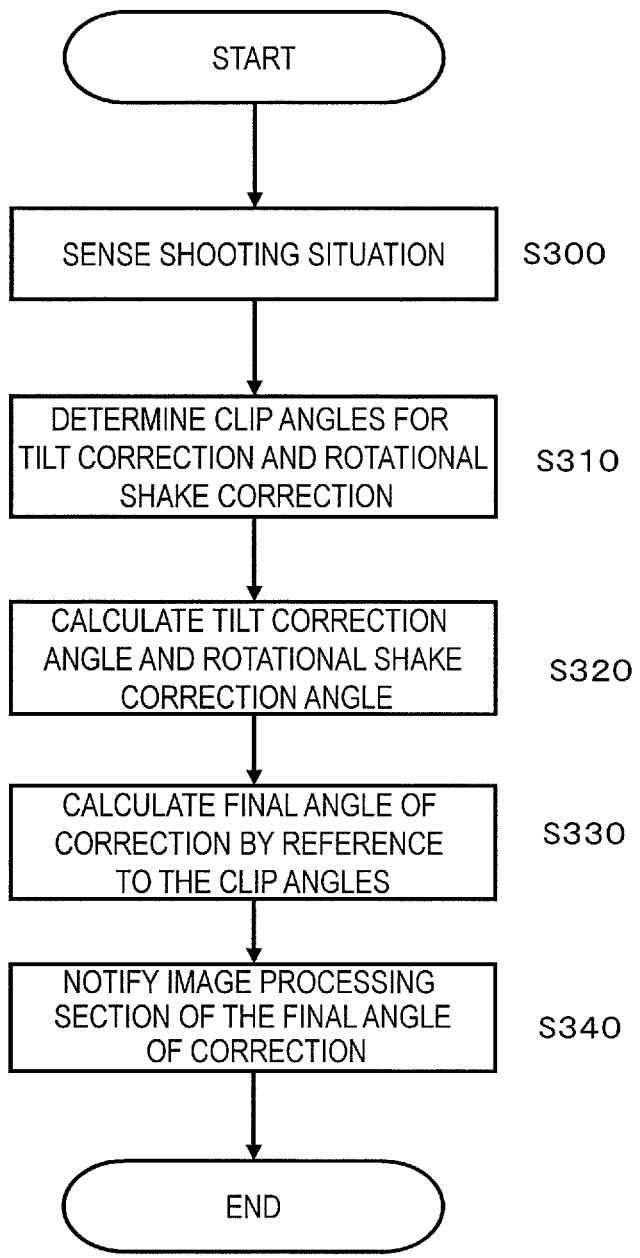
FIG. 5 is a flowchart showing how to calculate clip angles for tilt correction and rotational shake correction and how to calculate a correction angle according to the shooting situation.

Furthermore, the technique of the present disclosure is also applicable to a software program defining the tilt offset correction operation and the processing of prioritizing either tilt correction or rotational shake correction according to the shooting situation. The operation defined by such a program may be performed as shown in FIG. 3 or 5, for example. Such a program may be either distributed by being stored on a removable storage medium or downloaded over telecommunications lines. Various kinds of operations that have been described for the embodiments of the present disclosure can be performed by making a processor built in a computer execute such a program.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The present disclosure is applicable to not only digital camcorders but also digital cameras, cellphones with camera, smart phones with camera, and various other electronic devices as well.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-193780 filed on Sep. 4, 2012 and No. 2013-052266 filed on Mar. 14, 2013, the entire contents of which are hereby incorporated by reference.

What is claimed is:

1. An image capture device, comprising:
an image capturing section configured to capture a subject image and to generate an image;
an acceleration sensor configured to detect acceleration;

an angular velocity sensor configured to detect angular velocity;

a controller configured to determine one shooting situation from a plurality of shooting situations according to a result of detection obtained by the angular velocity sensor and to determine, according to the determined shooting situation, a first correction angle that is based on a result of detection obtained by the acceleration sensor and a second correction angle that is based on a result of detection obtained by the angular velocity sensor; and an image processing section configured to rotate the generated image based on an angle obtained by adding together the first and second correction angles.

2. The image capture device of claim 1, wherein the controller determines first and second upper limit angles, which define the upper limits of the first and second correction angles, respectively, according to either the amplitude or frequency of an output signal of the angular velocity sensor.

3. The image capture device of claim 2, wherein the controller determines the first correction angle by comparing a first calculated angle that has been calculated based on the result of detection obtained by the acceleration sensor to the first upper limit angle and also determines the second correction angle by comparing a second calculated angle that has been calculated based on the result of detection obtained by the angular velocity sensor to the second upper limit angle.

4. The image capture device of claim 3, wherein the controller sets the first upper limit angle to be the first correction angle if the first calculated angle is greater than the first upper limit angle and sets the first calculated angle to be the first correction angle if the first calculated angle is equal to or smaller than the first upper limit angle.

5. The image capture device of claim 3, wherein the controller sets the second upper limit angle to be the second correction angle if the second calculated angle is greater than the second upper limit angle and sets the second calculated angle to be the second correction angle if the second calculated angle is equal to or smaller than the second upper limit angle.

6. An image processor configured to process an image supplied from an image capturing section including an acceleration sensor that detects acceleration and an angular velocity sensor that detects angular velocity, the image processor comprising:

a controller configured to determine one shooting situation from a plurality of shooting situations according to a result of detection obtained by the angular velocity sensor and to determine, according to the determined shooting situation, a first correction angle that is based on a result of detection obtained by the acceleration sensor and a second correction angle that is based on a result of detection obtained by the angular velocity sensor; and an image processing section configured to rotate the generated image based on an angle obtained by adding together the first and second correction angles.

7. An image processing method for processing an image supplied from an image capturing section which includes an acceleration sensor configured to detect acceleration and an angular velocity sensor configured to detect angular velocity, the image processing method comprising the steps of:

determining one shooting situation from a plurality of shooting situations according to a result of detection obtained by the angular velocity sensor;

determining, according to the determined shooting situation, a first correction angle that is based on a result of detection obtained by the acceleration sensor and a second correction angle that is based on a result of detection obtained by the angular velocity sensor; and rotating the generated image based on an angle obtained by adding together the first and second correction angles.

* * * * *